INVENTORS
FREDERICK G. RIDGERS
DAVID A. STEVENSON
BY
ATTORNEY

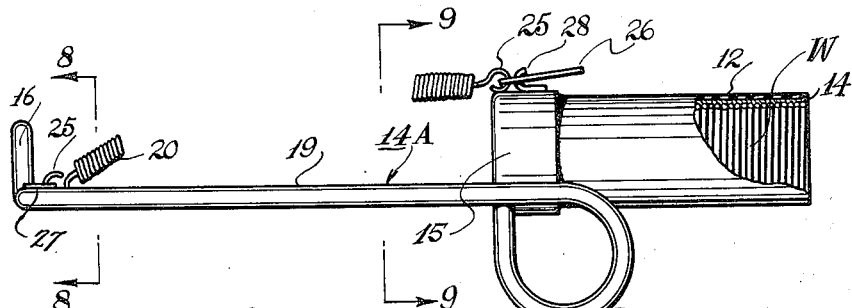
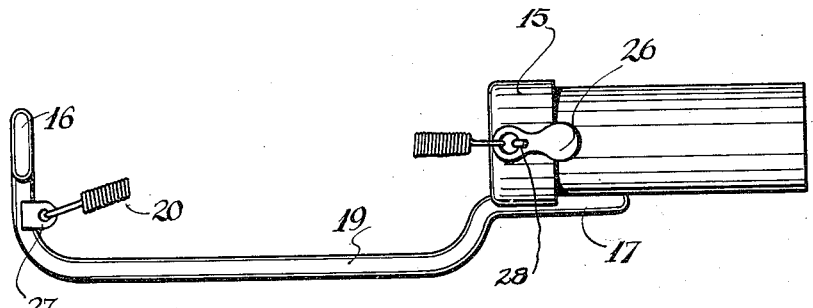
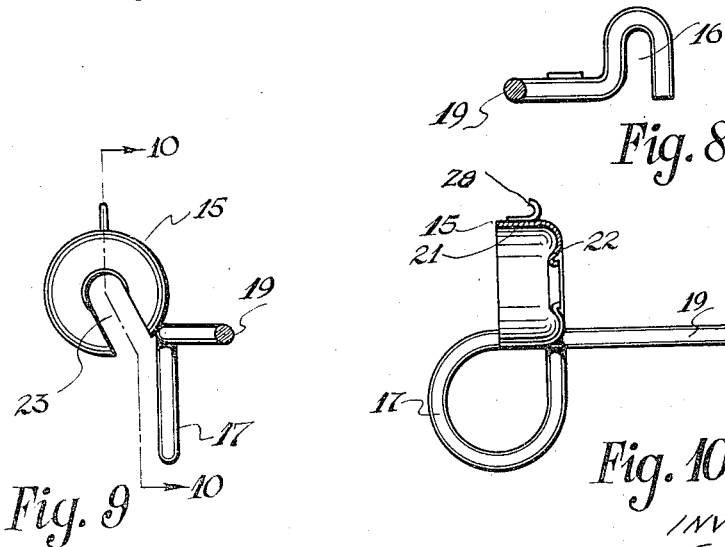

United States Patent Office 2,822,146
Patented Feb. 4, 1958

2,822,146

CABLE LASHING DEVICE

Frederick G. Ridgers, Hamilton, Ontario, and David A. Stevenson, Valois, Quebec, Canada, assignors, by mesne assignments, to Bell Telephone Company of Canada, Montreal, Quebec, and N. Slater Company Limited, joint tenants, Hamilton, Ontario, Canada Application July 6, 1954, Serial No. 441,205

8 Claims. (Cl. 254—134.3)

This invention relates to a cable lashing device.

As is well known, a cable lashing device serves to lash a cable to a wire, called a messenger, from which the conductor cable is suspended at spaced intervals.

The objects of the invention, generally, are to improve on known cable lashing devices.

A specific object of the invention is to provide a cable lashing device wherein a flexible member is spirally wound under tension around both the cable and the messenger to apply pressure thereto at closely disposed points longitudinally thereof, the device being towed along the cable and messenger wire longitudinally thereof to lash one to the other.

Another specific object is to provide a cable lashing device wherein a tensioned, flexible member is wrapped spirally around both the cable and the messenger wire to engage and hold the same together side by side as they are being lashed one to the other, by towing the device along the cable and messenger wire longitudinally thereof Another specific object is to provide a cable lashing device wherein a length of lashing wire is spirally wound in the form of a single layer spool or cartridge which is movable with the device over both the cable and the messenger wire and from which the lashing wire is fed as the device is towed along the messenger wire to lash the cable to the messenger wire.

Another specific object is to provide a cable lashing device wherein a frame serves to hold a cartridge of lashing wire, the frame being easily applied to the messenger wire and being as easily removed therefrom.

Still another specific object is to provide a spool or cartridge of wire for lashing a cable to a messenger wire, in the form of a single layer of spirally wound wire held to and within a sleeve of some frangible material, such as paper, as by paraffin, so that the wire will easily unwind and any portion of the sleeve from which the wire has been unwound may be easily severed.

In the drawings, wherein is shown the preferred form of the invention,

Figure 6 is a fragmentary side view of the device, the cartridge being in part broken away;

Figure 7 is a plan view of Figure 6;

Figure 8 is a section on line 8—8 in Figure 6;

Figure 9 is a section on line 9—9 in Figure 6; and,

Figure 10 is a section on line 10—10 in Figure 9.

Referring now by numerals to the drawings, wherein like numerals of reference indicate corresponding parts in the various views, A is a messenger wire anchored at its opposite ends to conventional fittings secured say to poles P—P. It will be understood however, that the span may be from a pole to a building, or even between two buildings.

Figure 1:
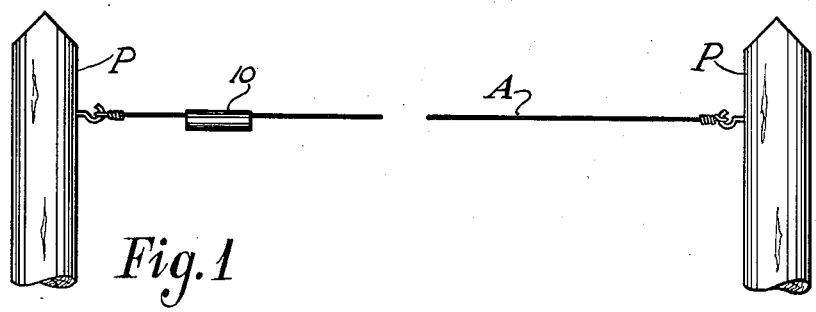
Figure 1 is a more or less diagrammatic view of a messenger wire, with cartridge of lashing wire in preliminary position.
Figures 2, 3:
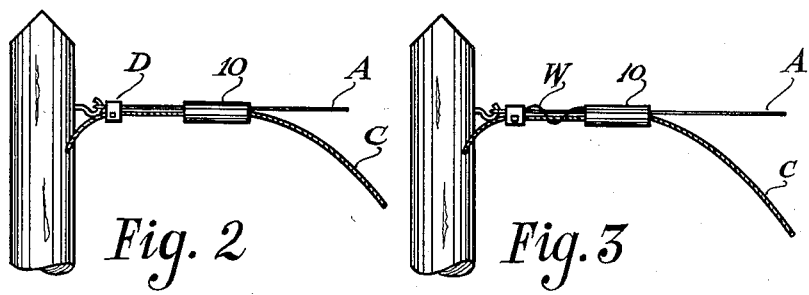
Figure 2 is a fragmentary view of Figure 1, showing one end of the cable inserted through the cartridge and temporarily clamped to the messenger wire.
Figure 3 is a view similar to that of Figure 2, showing a length of the lashing wire attached to the pole fitting and spirally wrapped around both the cable and the messenger wire.

Before the messenger wire is fully anchored, one end is inserted through the cartridge 10—later to be described in detail—so that the cartridge may be supported by the wire. After the wire has been fully anchored, as seen in Figure 1, one end of the cable C is inserted through the cartridge and the cable temporarily attached to the wire as by say, a clamp D, as seen in Figure 2. A preliminary length of lashing wire, say about twelve inches, is unwound from the cartridge, and twisted around both the messenger wire and the cable, and also attached to the clamp or fitting D, as seen in Figure 3. Now there are three wires secured together near their end portions, namely, the messenger wire or cable, the conductor cable, and the lashing wire.

Figure 4:
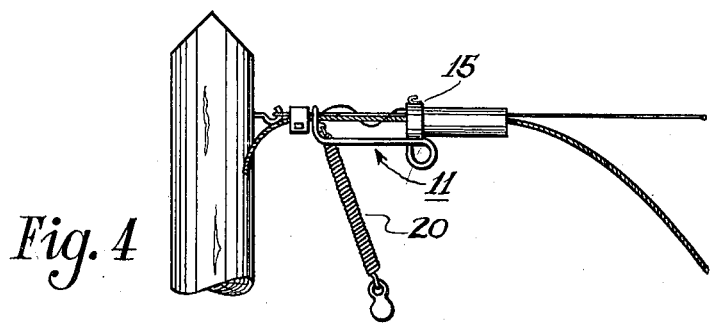
Figure 4 shows the device in position.

The lashing device 11—later to be described in detail— is next applied onto the messenger wire and cable, between the clamp fitting and the cartridge, and the device towed gently until the cartridge is received into a certain socket 15 of the lashing device, as seen in Figure 4. The device may now be operated or towed.

The cartridge 10, in the form of a sleeve as already stated, comprises a length of wire W closely spirally wound in one single layer. Preferably, the wire is wound so that the successive convolutions touch one another. The wire W is coiled around a mandrel (not shown) and the coil is covered with a paper wrapping 12 the wrapping being applied while the coil is on the mandrel. The paper-covered coil is removed from the mandrel and immersed into hot paraffin to form a bond 14 between the wire and the inside face of the paper cover or wrapper, and also to stiffen the cover, the coil and cover thus forming a unit or cartridge.

The length of wire coiled into a cartridge is chosen to provide a length of lashing wire sufficient to lash a given or approximate length (or lengths) of cable. The diameter of the coil determines to a great extent the pitch of the lashing wire when in its final lashed form. Such diameter must be kept within certain limits so that the coil usually has an encirclement of lashing wire every six to eight inches.

Paraffin has been found to be a desirable medium for binding the wire to the paper wrapper, in that even if it sometimes clings to the wire in the form of fins, it does not damage the insulation of the cable when the same sways or vibrates under the action of a high wind.

The lashing device proper 11 will now be described. It comprises a rigid elongate frame 14A adapted to be supported by the messenger wire, to be moved therealong, one end of the frame having the socket 15 aforesaid adapted to receive one end of the cartridge 10.

The frame may be conveniently made as shown from a length of steel rod, presenting a straight portion 19, an end U-shaped portion or hook 16 to provide a guide in which the messenger wire, cable, and lashing wire are received lengthwise and by which one end—the rearward end—of the frame is supported, and an eye 17 at the opposite end by which the device may be moved or towed lengthwise along the messenger wire as by a rope R. To the forward end of the frame is secured, as by soldering or welding, the socket 15 aforesaid. The socket more or less assumes the shape of a circular cup defined by a cylindrical wall 21 and an apertured wall 22, which one end of the cartridge is adapted to engage when received into the socket. The wall 22 is preferably curved inwardly as best shown in Figure 10, the better to receive the cartridge 10. A cut-out 23 is provided to present a slot or opening through one side of the socket, the axis of such slot being substantially parallel with the longitudinal axis of the hook 16 to permit of the device or frame being applied to messenger wire, to be supported thereby.

Adapted to be tensioned between the rear end of the frame and the forward end of the frame—more particularly the socket 15, is a coil spring 20. Swivelled to the opposite ends of the coil spring are two eyes or swivelled portions 25—25. One eye is attached to a bracket 27 formed on the rearward end of the frame, and to the other eye is attached a tab 26 formed with an opening adapted to engage into an open hook 28 formed on the socket. The swivels are for keeping the spring from twisting on its axis.

Figure 5:
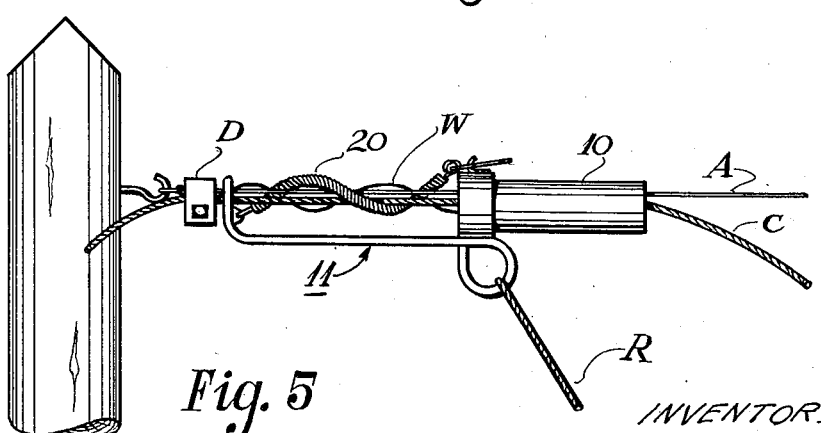
Figure 5 shows the device in fully operative position, ready to be towed to lash the cable to the messenger wire.

The spring is adapted to be spirally wound around the messenger wire, the cable, and the loose end of the lashing wire to hold all three in tight engagement one with the other, as best seen in Figure 5. As the device is towed along the messenger wire, the cable, and the uncoiled or free end of the lashing wire, the spring wipes or slidingly engages all three, holding them close together. The friction between the paper wrapping of the cartridge and the socket 15 prevents the cartridge from rotating in the socket, so that the lashing wire, as it unwinds from the coil, spirally wraps itself around the cable and the messenger wire.

Obviously the spring is wound about the messenger wire and the cable in the direction opposite that in which the lashing wire is to be wound.

After the lashing operation is completed the end of the lashing wire is suitably anchored, and the lashing device removed.

For convenience in handling the lashing device when not in use, the spring 20 is formed in such a length as to engage the hook 28 while in substantially relaxed form. Thus the spring is held against dangling or thrashing, and the device is therefore compact when not in actual service. It is thus shown in Figures 6 and 7.

We claim:

1. In a device for lashing a cable to a messenger wire, an elongate frame having supporting means adjacent its opposite ends, means carried by one end of said frame for supplying a continuous length of lashing wire to the messenger wire and the cable to lash the same together, and a spring spirally wound around the messenger wire, the cable, and lashing wire, said spring attached under tension to longitudinally spaced portions of said frame.

2. A device for lashing a cable to a messenger wire by means of a continuous length of lashing wire, comprising an elongate frame having supporting means affixed to opposite ends thereof by which said frame is slidably supported on the messenger wire for displacement therealong, and a coil spring attached to longitudinally spaced portions of said frame under tension, and spirally wound around the messenger wire, the cable, and the lashing wire.

3. A device for lashing a cable to a messenger wire, comprising an elongate frame having a guide adjacent one end, a second guide adjacent the opposite end of said frame, a spool receiving member on said second guide supporting a spool of lashing wire, a towing member adjacent said spool receiving member depending substantially vertically when said frame is supported by the messenger wire, and a coil spring having end swivel portions attached to longitudinally spaced portions of said frame under tension after said spring is spirally wound around the messenger wire, the cable and the lashing wire.

4. In a device for lashing a cable to a messenger wire, an elongate frame having hook-like portions adjacent its opposite ends forming means by which said frame is suspended from the messenger wire for displacement longitudinally thereon, means carried by one end of said frame for supplying a continuous length of lashing wire to the messenger wire and the cable to lash the same together, and tensioned means carried by said frame and at least in part surrounding the messenger wire, the cable, and the lashing wire to press all three together and wipe the same as said frame is moved forwardly therealong in the process of lashing the cable.

5. In a simple device for lashing a cable to a messenger wire by means of a lashing wire, a heavy wire frame having a vertical support hook at its rear end for loosely hanging over the messenger wire, a vertical loop at its forward end for pulling it slidingly along said messenger wire, and a horizontal sleeve having an inwardly flanged rear end, for receiving the rear end of a closely wound coil of lashing wire of corresponding diameter, said sleeve being fixed to the top of said loop and slotted radially near its juncture with said loop, to form another slidable hook support for loosely hanging over said messenger wire.

6. The combination defined in claim 5, said coil of lashing wire comprising a single cylindrical layer of said wire, having a coating of adhesive wax to hold the coil intact while its rear end is being peeled off and fed through the rear end of said sleeve and lashed around said cable and messenger wire, turn for turn, as the device is slid forward thereon.

7. The combination of claim 6, and a coiled spring with swivelled ends for stretchably connecting between the ends of said frame with at least one pass around said cable and messenger and lashing wires, for resiliently wiping over and drawing out said lashing wire to its maximum pitch progressively during a lashing operation.

8. A device for lashing a cable to a messenger wire by means of a continuous length of lashing wire, comprising an elongate frame, means on opposite ends of said frame for supporting said frame on said messenger wire, said supporting means on one of said ends having wire spool holding means thereon, and a coil spring including swivel end portions attached to longitudinally spaced portions of said frame under tension when spirally wound around the messenger wire, the cable, and the lashing wire between said opposite ends of the frame.

References Cited in the file of this patent

UNITED STATES PATENTS

| | | |
|---|---|---|
| 1,596,851 | Curry | Aug. 17, 1926 |
| 2,083,398 | Rohland | June 8, 1937 |
| 2,213,363 | Creswell | Sept. 3, 1940 |
| 2,552,594 | Scott, Jr. | May 15, 1951 |